(12) United States Patent
Pos

(10) Patent No.: US 9,725,106 B2
(45) Date of Patent: Aug. 8, 2017

(54) CHILD PUSH CHAIR FRAME AND CHILD PUSH CHAIR

(71) Applicant: CYBEX GMBH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 14/740,697

(22) Filed: Jun. 16, 2015

(65) Prior Publication Data

US 2015/0360709 A1  Dec. 17, 2015

(30) Foreign Application Priority Data

Jun. 16, 2014 (DE) .................. 10 2014 108 428
Jul. 21, 2014 (DE) .................. 10 2014 110 215

(51) Int. Cl.
*B62B 7/06* (2006.01)
*B62B 9/10* (2006.01)
*B62B 9/08* (2006.01)
*B62B 7/08* (2006.01)

(52) U.S. Cl.
CPC .................. *B62B 7/06* (2013.01); *B62B 7/08* (2013.01); *B62B 9/082* (2013.01); *B62B 9/085* (2013.01); *B62B 9/102* (2013.01); *B62B 7/062* (2013.01); *B62B 2205/24* (2013.01); *B62B 2205/26* (2013.01)

(58) Field of Classification Search
CPC ..... B62B 7/062; B62B 7/086; B62B 2205/24; B62B 2205/26
See application file for complete search history.

(56) References Cited

U.S. PATENT DOCUMENTS

| 2,670,216 | A | * | 2/1954 | Leonard | B62B 7/08 280/47.25 |
|---|---|---|---|---|---|
| 4,915,401 | A | * | 4/1990 | Severson | B62B 5/0023 224/155 |
| 5,863,061 | A | * | 1/1999 | Ziegler | B62B 7/08 280/42 |
| 6,357,784 | B1 | * | 3/2002 | Mitzman | B62B 7/02 280/30 |
| D463,329 | S | * | 9/2002 | Yang | B62B 7/02 D12/129 |
| D463,332 | S | * | 9/2002 | Wu | B62B 7/02 D12/129 |
| D470,802 | S | * | 2/2003 | You | B62B 7/02 D12/129 |

(Continued)

FOREIGN PATENT DOCUMENTS

WO  2010/040644 A1  4/2010

*Primary Examiner* — Hau Phan
*Assistant Examiner* — Jacob Meyer
(74) *Attorney, Agent, or Firm* — Drinker Biddle & Reath LLP

(57) ABSTRACT

A child push chair frame, such as a child push chair sports frame, buggy frame or similar vehicle frame for children, includes two rear wheels, at least one front wheel, and a pusher for pushing the child push chair frame. The child push chair frame may also include stabilizing struts that are foldable from a spread-apart travelling position into a fully folded-together transportation position and vice versa, and are latchable between these two positions and at least one further position, such as a parking position.

28 Claims, 15 Drawing Sheets

(56) References Cited

U.S. PATENT DOCUMENTS

| | | | | |
|---|---|---|---|---|
| 6,626,452 B2 * | 9/2003 | Yang | B60N 2/2845 | 280/643 |
| D502,896 S * | 3/2005 | Pullam | B62B 7/02 | D12/129 |
| 7,017,922 B2 * | 3/2006 | Hartenstine | B62B 7/10 | 224/409 |
| D519,419 S * | 4/2006 | Cheng | B62B 7/02 | D12/129 |
| D519,888 S * | 5/2006 | Cheng | B62B 7/02 | D12/129 |
| D532,721 S * | 11/2006 | Wu | B62B 7/02 | D12/129 |
| 7,377,537 B2 * | 5/2008 | Li | B62B 7/123 | 280/47.38 |
| D583,719 S * | 12/2008 | Siewertsen | B62B 7/02 | D12/129 |
| 8,042,828 B2 * | 10/2011 | Ageneau | B62B 7/068 | 280/642 |
| 8,087,689 B2 * | 1/2012 | Fritz | B62B 7/062 | 280/647 |
| 8,128,119 B2 * | 3/2012 | Saville | B62B 7/142 | 280/648 |
| 8,651,511 B2 * | 2/2014 | Chen | B62B 7/066 | 280/642 |
| 8,714,581 B2 * | 5/2014 | Fritz | B62B 7/08 | 280/642 |
| 8,894,089 B2 * | 11/2014 | Clifton | B62B 5/0023 | 280/642 |
| 8,919,806 B2 * | 12/2014 | Pollack | B62B 7/066 | 280/642 |
| 8,944,443 B2 * | 2/2015 | Lin | A63B 55/61 | 280/42 |
| 8,991,852 B2 * | 3/2015 | Mitzman | B62B 5/067 | 280/642 |
| 9,027,953 B2 * | 5/2015 | Funakura | B62B 7/08 | 280/650 |
| 9,481,389 B2 * | 11/2016 | Leys | B62B 7/12 | |
| 2007/0096434 A1 * | 5/2007 | Haeggberg | B62B 7/062 | 280/642 |
| 2009/0302577 A1 * | 12/2009 | Ageneau | B62B 7/068 | 280/642 |
| 2014/0008895 A1 * | 1/2014 | Lee | B62B 7/062 | 280/647 |
| 2014/0028001 A1 * | 1/2014 | Mitzman | B62B 5/067 | 280/642 |

* cited by examiner

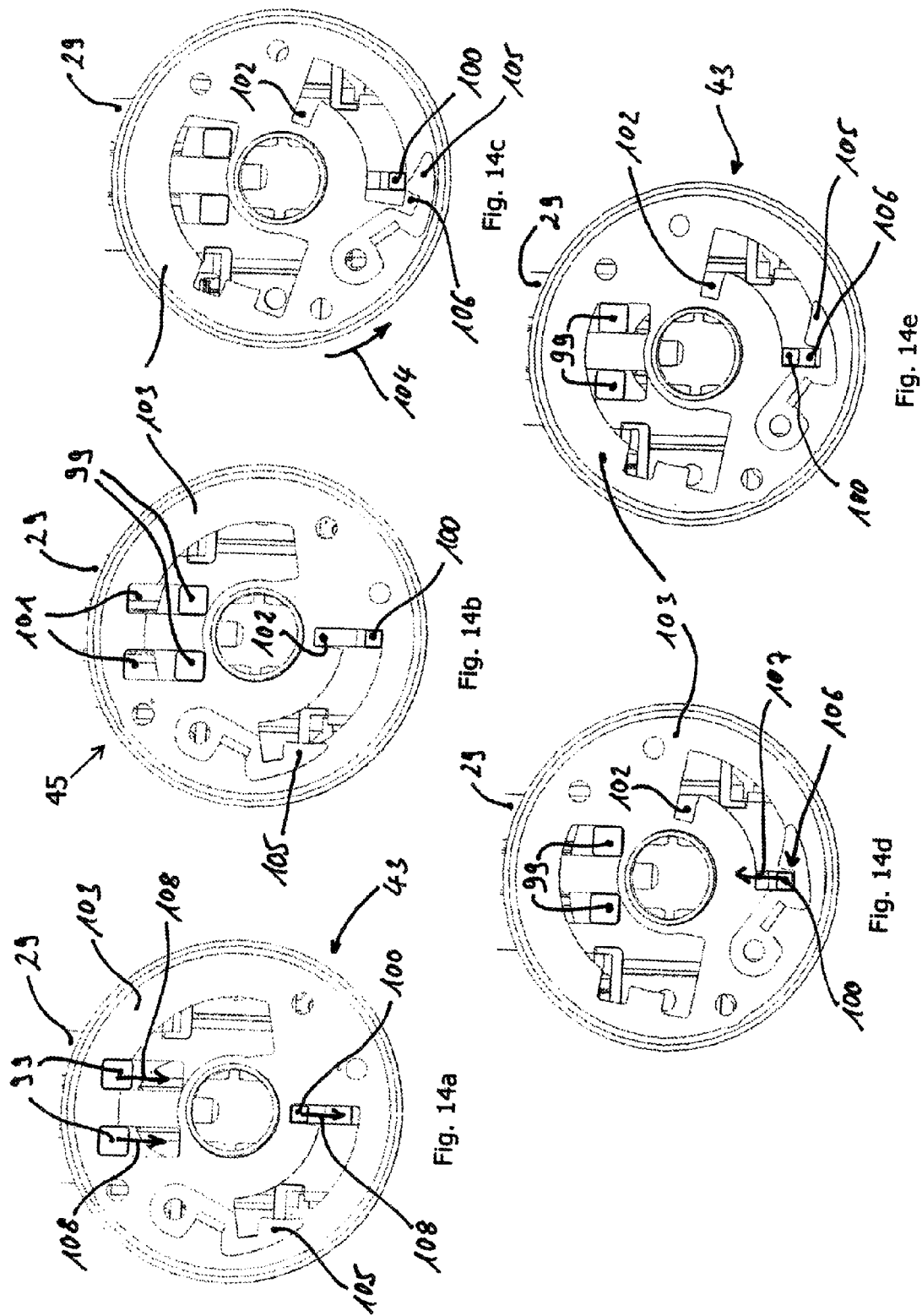

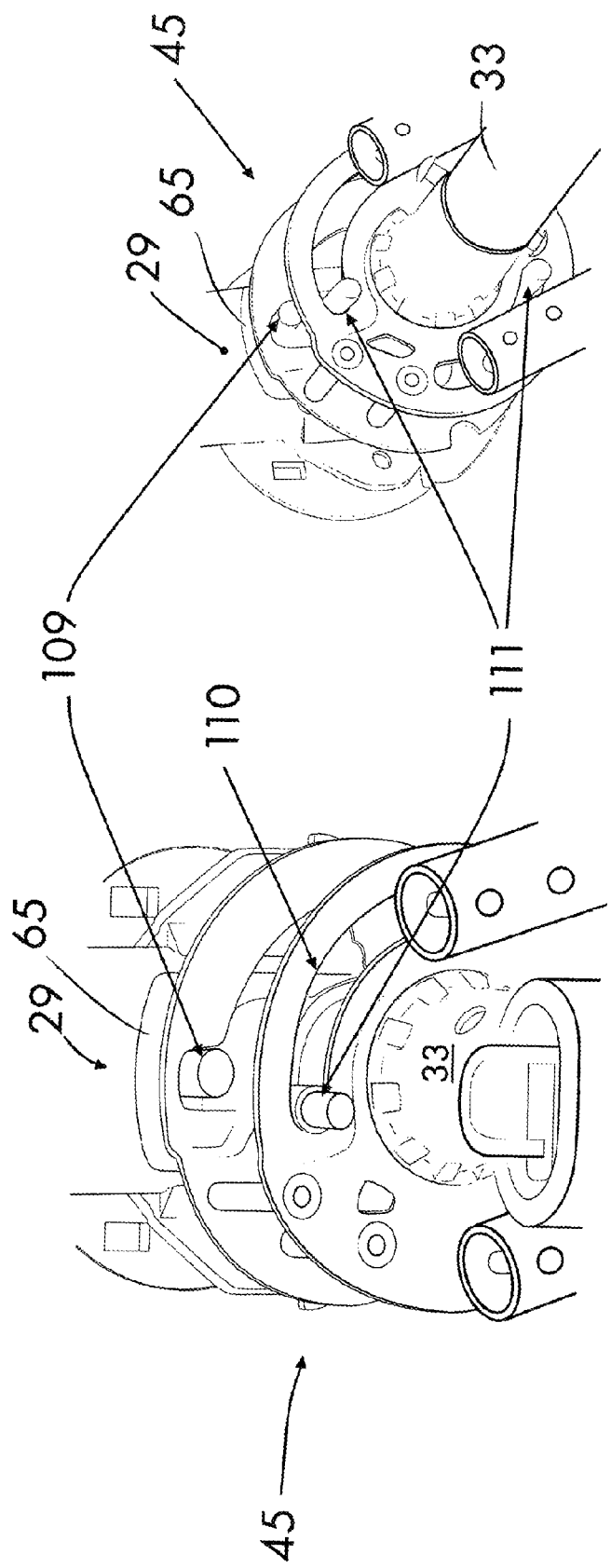

CHILD PUSH CHAIR FRAME AND CHILD PUSH CHAIR

CROSS-REFERENCE TO RELATED APPLICATIONS

This application claims priority to and the benefit of German Patent Application Nos. 10 2014 108 428.4 filed Jun. 16, 2014 and 10 2014 110 215.0 filed Jul. 21, 2014, the entire contents of which are incorporated herein by reference.

FIELD

Disclosed herein are a child push chair frame, in particular a child push chair sports frame, buggy frame or similar vehicle frame for children, and a child push chair.

BACKGROUND

Child push chair frames of the type addressed herein, particularly child push chair sports frames, buggies or similar vehicles for children have long been known and serve for the practical transport of babies and small children. A frequent problem with the known child push chair frames is the space requirement in the non-operational state. In particular for transportation, child push chair frames must be folded to be as small as possible and the conversion of the child push chair frame is to be as easy for a user as possible. Many known child push chair frames are difficult to manipulate with regard to the conversion from a travelling position into a transportation position and enable conversion of the child push chair frame only into a single non-operational state.

SUMMARY

Embodiments disclosed herein provide an improved child push chair frame which can be manipulated and converted particularly easily and flexibly by a user.

The child push chair frame disclosed herein comprises two rear wheels and at least one front wheel and a pusher to push the child push chair frame and fastening means for fastening a child push chair upper part. It is significant that the rear wheels and the at least one front wheel and/or the rotary axles thereof are each connected to one another by means of one or more rear and front stabilizing struts in articulated manner about a central axis which extends approximately parallel to the common rotary axle of the rear wheels such that said stabilizing struts are foldable from a spread-apart travelling position into a fully folded-together transportation position and vice versa, and are latchable between these two positions in at least one further position, in particular a parking position.

An essential feature is that the child push chair frame can be converted from a travelling position into a transportation position. In the transportation position, the child push chair frame has an end stop which, if desired, can be combined with a further locked and/or arrested state. Alternatively, the transportation position is not arrested, which advantageously enables rapid unfolding of the child push chair frame into the travelling position. In the parking position, which is situated, with regard to the folding position thereof, between the folding position of the child push chair frame in the travelling position and the folding position of the child push chair frame in the transportation position, the child push chair frame is lockable, wherein the child push chair frame in the parking position has a locking and/or arresting mechanism which is actuatable as desired on folding the child push chair frame.

In this way, the child push chair frame can be displaced from a travelling position into a fully folded-together state suitable for transport. It is additionally possible to convert the child push chair frame into a parking position capable of standing up in which the child push chair frame has a small size and therefore has a small space requirement, but in which the child push chair frame can nevertheless stand independently.

Provided that the transport position is combined with a locking and/or arresting mechanism, as an optional embodiment provides, it is possible in the completely folded-together state of the child push chair frame to extend the pusher in order to pull or push the child push chair together with the child push chair upper part on the two rear wheels. According to this embodiment, the stabilizing struts are latchable, aside from the travelling position, also in the fully folded-together transportation position. This option comes into consideration particularly if the child push chair is to be used on difficult, particularly uneven, surfaces.

According to another embodiment, the child push chair frame has a locking position or a locked and/or arrested state in the travelling position, wherein the spread-apart travelling position of the stabilizing struts can be fixed by means of an articulated connection between the rear and the front stabilizing struts. It is ensured with this advantageous embodiment that the spread-apart travelling position is maintained not only due to gravity when the stabilizing struts and the rear wheels and the at least one front wheel slide or roll, under the effect of gravity, into the fully spread-apart travelling position, but also when the child push chair frame is, for example, lifted up in order to lift it, for example, over a stair tread.

Embodiments also provide that the stabilizing struts can also be fixed in the fully folded-together transportation position and/or in the at least one further position, in particular parking position, by means of the articulated connection between the rear and the front stabilizing struts and, if necessary, unlatched.

Advantageously, the articulated connection therefore serves as a multifunctional latching and unlatching unit with which the folding functionality of the child push chair frame can be actuated.

Furthermore, the conversion of the child push chair frame can be carried out particularly simply by means of an advantageous switching unit and a displacement of the pusher.

For the aforementioned purpose, it is advantageous if, firstly, the spread-apart travelling position of the stabilizing struts and, secondly, the at least two locking positions thereof can be fixed by means of the articulated connection between the rear and the front stabilizing struts. This takes place preferably by means of the aforementioned switching unit by means of which the articulated connection is switchable, in particular unlockable, from a fixing position into a releasing position and vice versa.

In one embodiment of the child push chair frame, each of the two rear wheels is connected to the at least one front wheel via a connecting piece. The connecting pieces are configured foldable such that they enable without restraint, or do not hinder, the folding together or folding apart of the rear and front stabilizing struts about the aforementioned articulated connection or the central axis defined thereby.

Advantageously, the connecting pieces have a joint at approximately half the distance between a rear wheel and a front wheel. By means of the joint, the folding ability of a connecting piece can be ensured. A foot actuating mechanism for initiating the folding process of the stabilizing struts and possibly also of the connecting pieces is preferably provided at a proximal end of a connecting piece. As soon as a user actuates the foot actuating mechanism and previously a latching mechanism of the switching unit has been released, the folding process of the connecting pieces can be initiated and the space requirement of the child push chair frame can consequently be significantly reduced. As an alternative to the foot actuating mechanism, a hand-operated initiation of the folding process can be provided by means of a cable pull or similar mechanism. The connecting pieces preferably form part of a basket receiving frame of the child push chair frame. Advantageously, the fastening means for fastening a child push chair upper part is arranged in the region of a central axle of the child push chair frame.

Advantageously, one or more rear stabilizing struts are provided between each rear wheel and the central axle of the child push chair frame and one or more front stabilizing struts are provided between each front wheel and the central axle. The stabilizing struts can serve to latch the folding mechanism of the connecting pieces or to release it. In the latched position, the stabilizing struts serve to provide the child push chair frame with a high degree of stability in the normal operational state. At the same time, the stabilizing struts serve as blocking elements which prevent folding-together of the child push chair frame by folding of the connecting pieces. Together with the connecting pieces, the front and rear stabilizing struts form an essentially triangular arrangement.

Preferably, the front and rear stabilizing struts each open into a switching unit in the region of the distal ends of the pusher. The switching unit comprises an actuating portion and a front and a rear bearing portion, wherein the actuating portion serves to accommodate a distal end of the pusher, the rear bearing portion serves to accommodate the proximal end of the rear stabilizing strut(s) and the front bearing portion serves to accommodate the proximal end of the front stabilizing strut(s). The front and rear bearing portion are advantageously arranged along the central axle directly adjoining one another. Therein, the central axle preferably connects the two switching units, each of which cooperates with a distal end of the U-shaped pusher.

Advantageously, in a normal operational state of the child push chair frame, the rear and the front bearing portion are non-rotatably connectable to one another. In order to initiate a folding process of the connecting pieces, however, the rear and the front bearing portion are rotatably connectable to one another. Switching over between a rotatable and a non-rotatable connection between the rear and the front bearing portion of a switching unit is advantageously achieved by means of a displacement of the pusher in the actuating portion of the respective switching unit. In this way, the non-rotatable connection between the rear and the front bearing portion can be released by a single one-handed operation of the pusher so that both the stabilizing struts can be rotated relative to one another about the central axle. In this operating state of the child push chair frame, folding of the connecting pieces between a front wheel and a rear wheel is also possible. A displacement of the pusher in the actuating portion preferably causes a displacement of an unlatching bolt along the central axle. Consequently, through the displacement of the unlatching bolt, the non-rotatable connection between the rear and the front bearing portion can be released.

The switching section is rigidly connected to the central axle and so is arranged non-rotatably.

According to one embodiment, the fastening means firmly connected to the front bearing portion for fastening a child push chair upper part comprise an elastically pre-tensioned locking bolt which corresponds with a locking recess arranged on the outer periphery of the rear bearing portion and, together with this locking recess, forms a "soft lock". This locking mechanism defines the parking position of the child push chair frame in which the front and rear stabilizing struts are not fully folded together.

The switching unit also comprises a locking device, for example a locking pin which, in the spread-apart travelling position of the stabilizing struts, is situated within a locking recess. By means of an actuating pusher which is mounted longitudinally displaceable within the pusher receptacle, the locking pin can be moved out of the locking recess, specifically in a circular arc-shaped guide section and together with the pusher into an end position in which the front and rear stabilizing struts are fully folded together. Together with the pusher, the rear stabilizing struts are foldable in the direction toward the front stabilizing struts. The circular arc-shaped guide section is situated within the rear bearing portion connected to the rear stabilizing strut.

With the pusher fully driven in, the aforementioned actuating pushers can be moved by switching projections mounted thereon into the aforementioned unlatching or unlocking position. In this way, the switching unit can be unlatched by the pusher.

The circular arc-shaped guide section can have a locking recess shortly before the end stop in which the locking bolt can be introduced if needed, specifically by means of a spring force acting on the locking bolt. In this way, the parking position of the child push chair frame can be fixed. The unlatching is then carried out in the same way as the unlatching in the spread-apart travelling position of the child push chair frame.

According to an alternative embodiment of the switching unit, said switching unit comprises a displacement plate which has at one end one, preferably two, locking projections and/or at the opposite end, a further locking projection. These locking projections correspond with associated locking recesses on a switching disk of the switching unit. By means of the pusher, the aforementioned projections can be brought into an unlatching position. In this position, the switching disk can be rotated relative to the displacement plate until the one locking projection engages in a recess of a spring-loaded hook. In this position, the front and rear stabilizing struts are fully folded together and locked in the transportation position. For unlocking, the displacement plate is moved by means of the pusher into an unlatching position. The small latching projection then moves out of the associated recess on the locking hook, so that the switching disk can be turned back into the original position, specifically into a position in which the front and rear stabilizing struts are again fully spread apart. The displacement plate is movable against an elastic pre-tension out of the locking position. If desired, the switching unit according to the invention can also have one or more intermediate locking positions.

Another embodiment differentiates between a locking projection connected to the displacement plate and a pin-like projection guided within a circular arc-shaped guide section. This pin-like projection is configured to serve as a rotation stop and to bear transverse loads. In the end positions of the stop pin, the latching projection is transverse load-free. The latching projection therefore serves only to define the latching position in the fully spread-apart position of the stabilizing struts and does not bear any transverse loads, so that latching and particularly also unlatching can easily be carried out, and essentially without friction.

The switching unit is preferably actuatable by means of a displacement, in particular a sliding and/or rotary movement of the pusher. Advantageously, the actuating portion is mounted rotatable relative to the front and rear bearing portion of a switching unit. In this way, a rotary movement and blocking of the rotary position of the pusher is possible.

In order to achieve the aforementioned object, a child push chair having the features of claim 21 is also proposed. The child push chair comprises a child push chair frame and a child push chair upper part which can be, for example, a carrying shell, a high chair frame, a child car seat, a carry cot or other type of child push chair upper part.

BRIEF DESCRIPTION OF THE DRAWINGS

Following is a detailed description with reference to the drawings, in which:

FIGS. 14a-14e show a schematic representation of an alternative switching unit in functional views, and FIGS. 15a-15b show a schematic representation of a partly opened alternative switching unit of a child push chair frame according to the disclosure.

DETAILED DESCRIPTION

Figure 1:
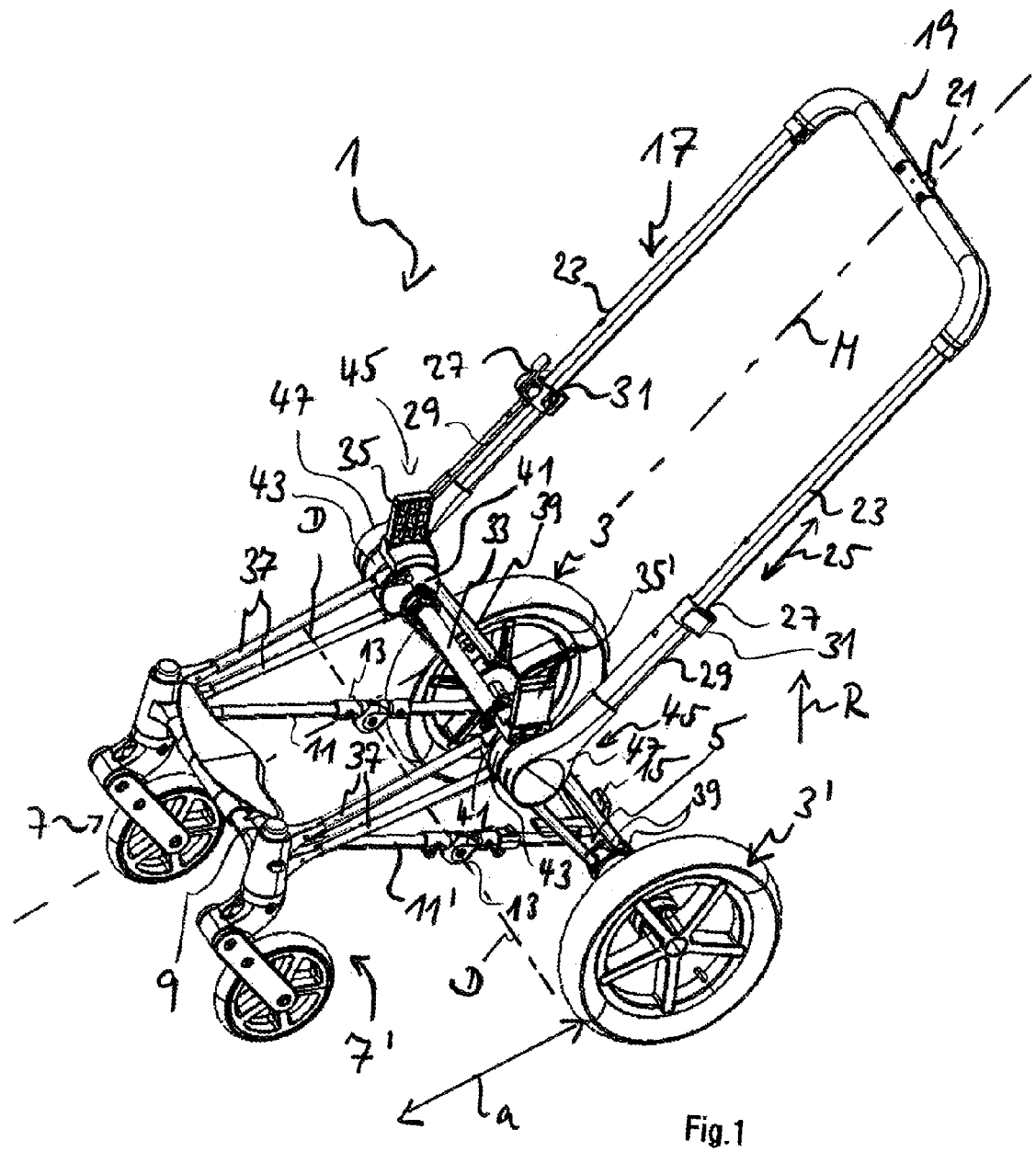
FIG. 1 shows a perspective view of a child push chair frame according to the disclosure.

FIG. 1 shows a perspective view of a child push chair frame 1 according to the disclosure. In the present embodiment, the child push chair frame 1 comprises two rear wheels 3 and 3' which are rotatably connected to one another via a common rear axle 5. The child push chair frame 1 further comprises two front wheels 7 and 7' which, like the rear wheels 3, 3' are also rotatably connected to one another via a common front axle 9. Each rear wheel 3, 3' is at least indirectly connected to an associated front wheel 7, 7' by means of a connecting piece 11 or 11'. The connecting pieces 11 and 11' can also be configured integrally in the form of a U-shaped, bow-shaped or rectangular strut design.

Thus, one connecting piece 11, 11' is associated with each wheel pair. Relative to an imaginary central plane M of the child push chair frame 1, the child push chair frame thus has a total of two connecting pieces 11, 11', each of which connects a rear wheel 3 to a front wheel 7 or the front axle 9 and the rear axle 5. In the event that only one front wheel is provided, two connecting pieces 11, 11' connect the two rear wheels 3, 3' to one and the same front wheel.

Each of the connecting pieces 11, 11' comprises a joint 13 which is arranged essentially half way between the rear wheels 3, 3' and the front wheels 7, 7' and therefore effectively in the middle of the connecting pieces 11, 11'. A connecting piece 11, 11' is thus preferably configured in two parts, both the parts being pivotably connected to one another via the joint 13.

In order to bring about a pivot movement of the connecting piece 11, 11' about a rotary axis D of the joint 13, in the present embodiment of the invention, a foot actuating mechanism 15 is provided. With the help thereof, a user of the child push chair frame can effect a folding movement of the connecting piece 11, 11' with a foot while initiating a rotary movement of the sections of the connecting piece 11, 11' about the rotary axis D. The folding movement of the connecting piece 11, 11' and, in particular, a displacement of the joint 13 takes place in the direction of the arrow R, so that the separation a between the front wheels 7, 7' and the rear wheels 3, 3' is reduced. The direction R in which the joint 13 moves during the folding process of the connecting piece 11, 11' corresponds to a direction pointing away from the ground.

The child push chair frame 1 also comprises an essentially U-shaped pusher 17, which is provided for pushing the child push chair frame 1 by a user. For this purpose, the pusher comprises a handle region 19 which has a height adjustment device 21. The height adjustment device 21 can cooperate, for example, by means of a Bowden cable or similar mechanism. In particular, the height adjustment device 21 is actuated by means of a spring-mounted push button or similar mechanism. By means of the height adjustment device 21, the pusher 17 can be displaced in the direction of the limb 23 of the U-shaped pusher 17 (see arrow with the reference sign 25). For this purpose, the distal ends 27 of the pusher 17 are guided in a pusher receptacle 29, wherein the dimension of the height adjustment overall is delimited by clamping means 31 which are provided on the pusher receptacle 29. Thus if the clamping means 31 are closed, the pusher 17 can only be displaced within certain limits in the direction of the arrow 25 in the pusher receptacle 29.

The child push chair frame 1 further comprises a central axle 33 which essentially extends in the axial direction of the rear axle 5 or in the direction of the front axle 9 and thus essentially parallel to the rear axle and the front axle 9. The length of the central axle 33 essentially matches the length of the rear and/or front axle. FIG. 1 also makes clear that the central axle is arranged essentially half way between the rear axle 9 and the front axle 5 and thus essentially at the height of the joint 13. In the height direction, however, there is a separation between the joint 13 and the central axis M.

The child push chair frame 1 also comprises fastening means 35, 35' which are configured herein in the form of holding arms which extend essentially perpendicularly to the central axle 33 and are arranged at opposite ends of the central axle 33. The fastening means 35, 35' serve for receiving a child push chair upper part, in particular a carrying shell, a child pocket, a high chair frame, a child car seat or the like. Depending on the child push chair upper part that is to be mounted, the fastening means 35, 35' can be differently designed or, particularly, exchangeable in the form of adapter elements on the child push chair frame 1, for example by means of a dovetail guide.

The child push chair frame 1 also comprises stabilizing struts arranged between the axles, wherein between each front wheel 7, 7' and the central axle 33 at least one, in the present case two, front stabilizing struts 37 are provided, whereas between the rear wheels 3, 3' and the central axle 33, in the present case two rear stabilizing struts 39 are provided on each side of the central plane M. On both sides of the central plane M, in the operational state of the child push chair frame 1 shown in FIG. 1, the stabilizing struts 37, 39 form an essentially triangular arrangement together with the connecting pieces 11, 11'.

In the region of the central axle 33, the front stabilizing struts 37 open into a front bearing portion 41, whereas the rear stabilizing struts open into a rear bearing portion 43. In the present embodiment, the bearing portions 41, 43 are configured to be essentially cylindrical, each being arranged concentrically relative to the central axle 33. Two bearing portions 41, 43 are arranged on each side of the central plane M of the child push chair frame 1. The stabilizing struts can be, in particular, injection moulded, screwed, pushed or similar, into the bearing portions 41, 43. The front and rear bearing portions 41, 43 are each arranged at the ends of the central axle 33, wherein on each side of the central axle 33, a rear bearing portion 43 is arranged, in the axial direction of the central axle 33, directly adjoining a front bearing portion 41, and the bearing portions 41, 43 consequently adjoin one another. The bearing portions 41, 43 therefore serve to accommodate the proximal ends of the stabilizing struts 37, 39. The opposite distal ends of the stabilizing struts 37, 39, however, are connected to the wheels or the associated axles, wherein the connection between the front stabilizing struts 37 and the front wheels 7, 7' or the front axle 5 can be fixed, particularly immovably, whereas the connection between the rear stabilizing struts 39 and the rear wheels 3, 3' or the rear axle 5 is preferably (rotatingly) movable.

The front and rear bearing portions 41, 43 are part of a switching unit 45 which is configured as a compact multi-part unit, wherein a switching unit 45 is arranged at each end of the central axle 33. Apart from the bearing portions 41, 43, each switching unit 45 comprises an actuating portion 47 which is arranged directly adjoining a bearing portion, in the present case, adjoining the rear bearing portion 43 along or on the central axle 33.

The housing of the actuating portion 47 is connected to the pusher receptacle 29. It is also conceivable for an integral connection to be provided between the pusher receptacle and the housing of the actuating portion 47. The actuating portion 47 comprises a through opening (not shown in FIG. 1), which is configured such that the limbs 23 and, in particular, the distal ends 27 of the pusher 17 can be displaced through the actuating portion 47 and can emerge at the opposite side of the actuating portion 47, i.e. the side facing the ground. A displacement of the pusher 17 of this type in the direction of the arrow 25 is only possible, however, if the clamping means 31 are open and consequently, the restriction of the height adjustability of the pusher 17 is cancelled. In particular, the through opening can be configured integrally in the pusher receptacle 29.

In a normal operational state of the child push chair frame 1 shown in FIG. 1, the rear bearing portion 43 and front bearing portion 41 are non-rotatably connected to one another. A corresponding non-rotatable connection is achieved by means of an associated operating state of the switching unit 45, for example, by means of a locking or blocking connection between the two bearing portions 41, 43. By means of a displacement of the pusher 17 in the actuating portion 47, the non-rotatable connection between the bearing portions 41, 43 can be released. The fixed angular position of the stabilizing struts 37 and 39 relative to one another shown in FIG. 1 has been released in this operating state of the switching unit 45, so that a displacement of the joint 13 of the connecting pieces 11, 11' in the direction R is also possible. During a corresponding movement of the joint 13, the separation a between the front wheels 7, 7' and the rear wheels 3, 3' is simultaneously reduced, such that the child push chair frame 1 can be converted into a compact transportation state or a "stand-alone" state in which the child push chair frame 1 is capable of standing independently.

FIG. 1 also makes clear that the fastening means 35, 35' are connected to the rear bearing portion 43. As aforementioned, the connection can be made by means of a dovetail guide or a similar form-fitting connection, so that the fastening means are interchangeably mounted on the child push chair frame. Suitable means configured as a dovetail guide can be connected, particularly integrally, to the rear bearing portion 43. Naturally, a corresponding connection to the front bearing portion 41 or another element of the child push chair frame 1 is also possible.

Once the limbs 23 of the pusher 17 have been introduced sufficiently far into the actuating portion 47, not only is the non-rotatable connection between the rear and front bearing portion 41, 43 released, but the pusher 17 can then also be pivoted about the central axle 33 in the direction of the front wheels 7, 7' and can latch in there in a suitable locking position.

In order to re-create the non-rotatable connection between the front bearing portion 41 and the rear bearing portion 43, firstly, the pusher 17 must subsequently be displaced back into an original use position shown in FIG. 1. In order to enable a rotary movement of the pusher 17 about the central axle 33, the actuating portion 47 is rotatably mounted relative to the bearing portions 41, 45 and relative to the central axle 33 at or on the central axle 33.

The switching unit 45 consists overall of a compact unit which comprises three mutually separate elements, specifically the front bearing portion 41, the rear bearing portion 43 and the actuating portion 47, in order to ensure easy conversion of the child push chair frame 1, for example, for transportation. The switching unit 45 can have at least two operating states between which switching is possible by a hand-operated displacement of the pusher 17. In a first operating state of the switching unit 45, a non-rotatable connection exists between the front and the rear bearing portion 41, 43, whilst in the second operating state, a rotatable connection exists between the front and the rear bearing portion 41, 43.

Figure 2:
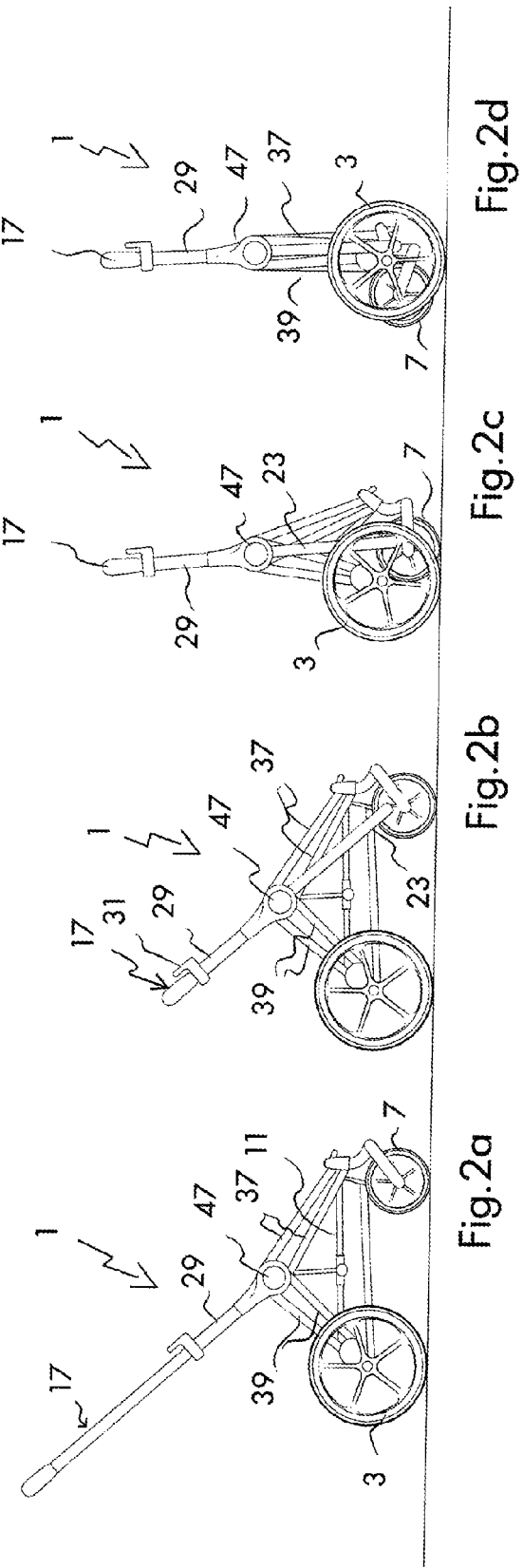
FIGS. 2a-2d show a variety of operating states of the child push chair frame.

FIGS. 2*a*-2*d* show the child push chair frame 1 in different operating states. FIG. 2*a* shows the conventional operational state of the child push chair frame 1 shown in FIG. 1 for conveying a baby or child with the aid of a child push chair upper part (not shown).

FIG. 2*b* shows the child push chair frame 1 in an operational state in which the limbs 23 of the pusher 17 in the released state of the clamping means 31 are guided through the actuating portion 47 and thus a non-rotatable connection between the front bearing portion 41 and the rear bearing portion 43 has been released. In this operating state, the stabilizing struts 37 and 39 are consequently mounted rotatable relative to one another about the central axle 33.

FIG. 2c shows the child push chair frame 1 in a storage state capable of standing, in which, although the size of the child push chair frame 1 is significantly reduced, the child push chair frame 1 can still stand independently in that a small separation a is maintained between the rear wheels 3, 3' and the front wheels 7, 7'.

FIG. 2d shows a further operating state of the child push chair frame 1 in which the connecting pieces 11, 11' have been folded together to the maximum extent with the aid of the joint 13 so that the separation between the front wheels 7, 7' and the rear wheels 3, 3' is reduced to the maximum extent. In this position, the child push chair frame 1 cannot stand independently. However, it has an even smaller space requirement than the operating state shown in FIG. 2c. In the operating state of FIG. 2d, the pusher 17 must not necessarily be pushed through the actuating portion 47. Rather, it is also conceivable to extend the pusher 17, following folding together of the child push chair frame 1, back to the normal operational state so that, as in the state shown in FIG. 2d, a child push chair upper part (not shown) can be connected to the child push chair frame 1 and a user can push or pull the child push chair frame 1 on two wheels. This operational state is particularly advantageous if the child push chair is to be conveyed over rough terrain. Reduction of the child push chair frame 1 to two wheels is advantageous in this case and facilitates movement overall.

FIGS. 2a-2d make clear that the present disclosure enables the production of a plurality of operational states of a single child push chair frame 1. It is therefore also possible, aside from the operational state shown in FIG. 2c, to achieve a minimum space requirement for the transportation of the child push chair frame 1. At the same time, in the state shown in FIG. 2d, by pulling or pushing on two wheels, the child push chair frame 1 can be used on difficult terrain. For each operating state, for simplified use, corresponding locking or arresting positions are provided.

The switching unit 45 which enables simple and flexible conversion of the child push chair frame 1 into the states shown in FIGS. 2a-2d, is described in greater detail below by reference to FIGS. 3 to 10.

Figure 3:
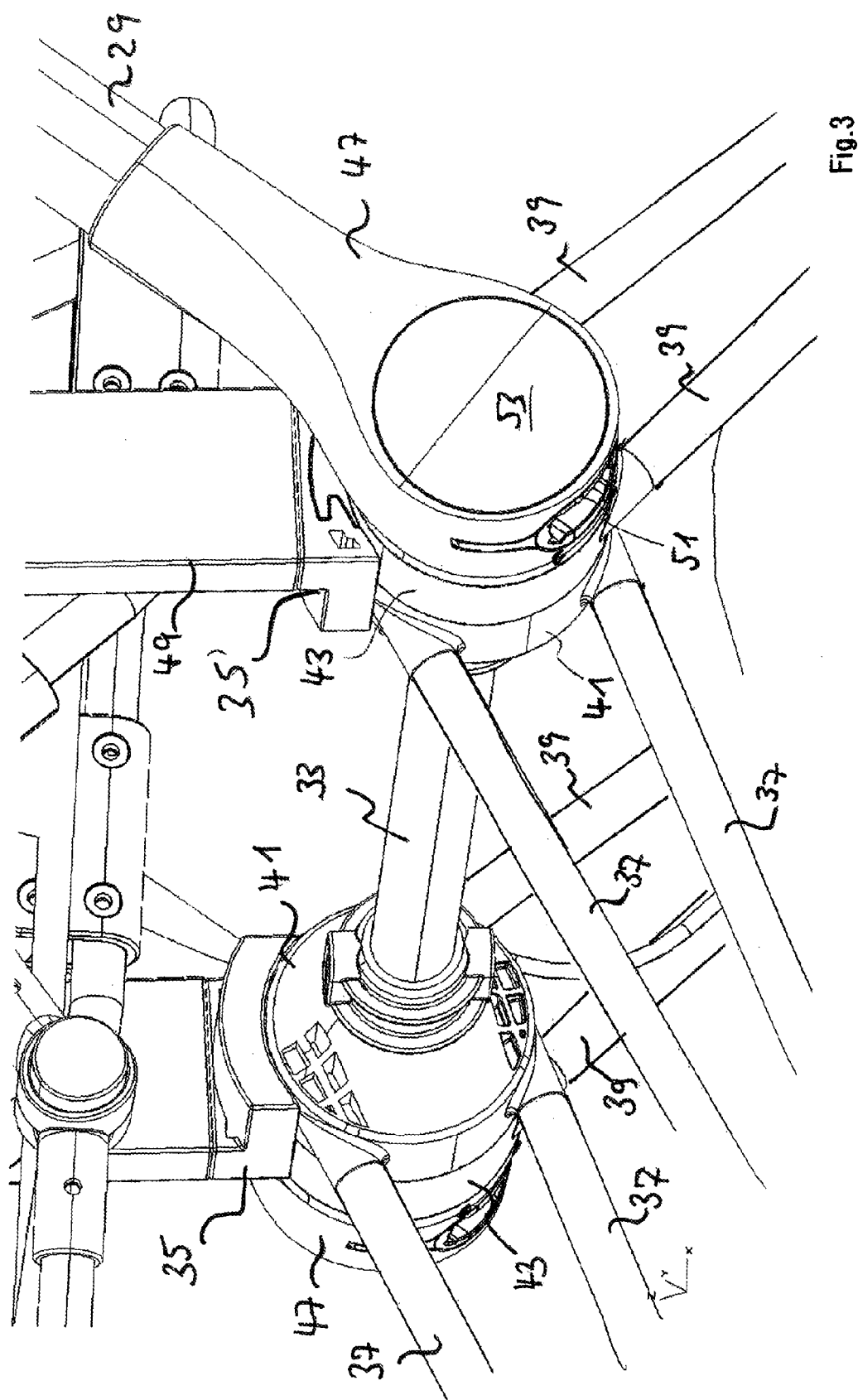
FIG. 3 shows a perspective view of a portion of the child push chair frame of FIG. 1.

FIG. 3 shows a perspective view of a portion of the child push chair frame 1 of FIG. 1. It is readily recognisable in FIG. 3 that the fastening means 35, 35' are connected to the switching unit 45. Also indicated in FIG. 3 is a child push chair upper part 49, which is connected to the fastening means 35, 35'. Also recognisable is a through opening 51 which is arranged in the actuating portion 47. In the event that a non-rotatable connection between the front bearing portion 41 and the rear bearing portion 43 is to be released, the pusher 17 (not shown in FIG. 3) or the distal ends 27 thereof must be pushed through the through openings 51.

Figure 4:
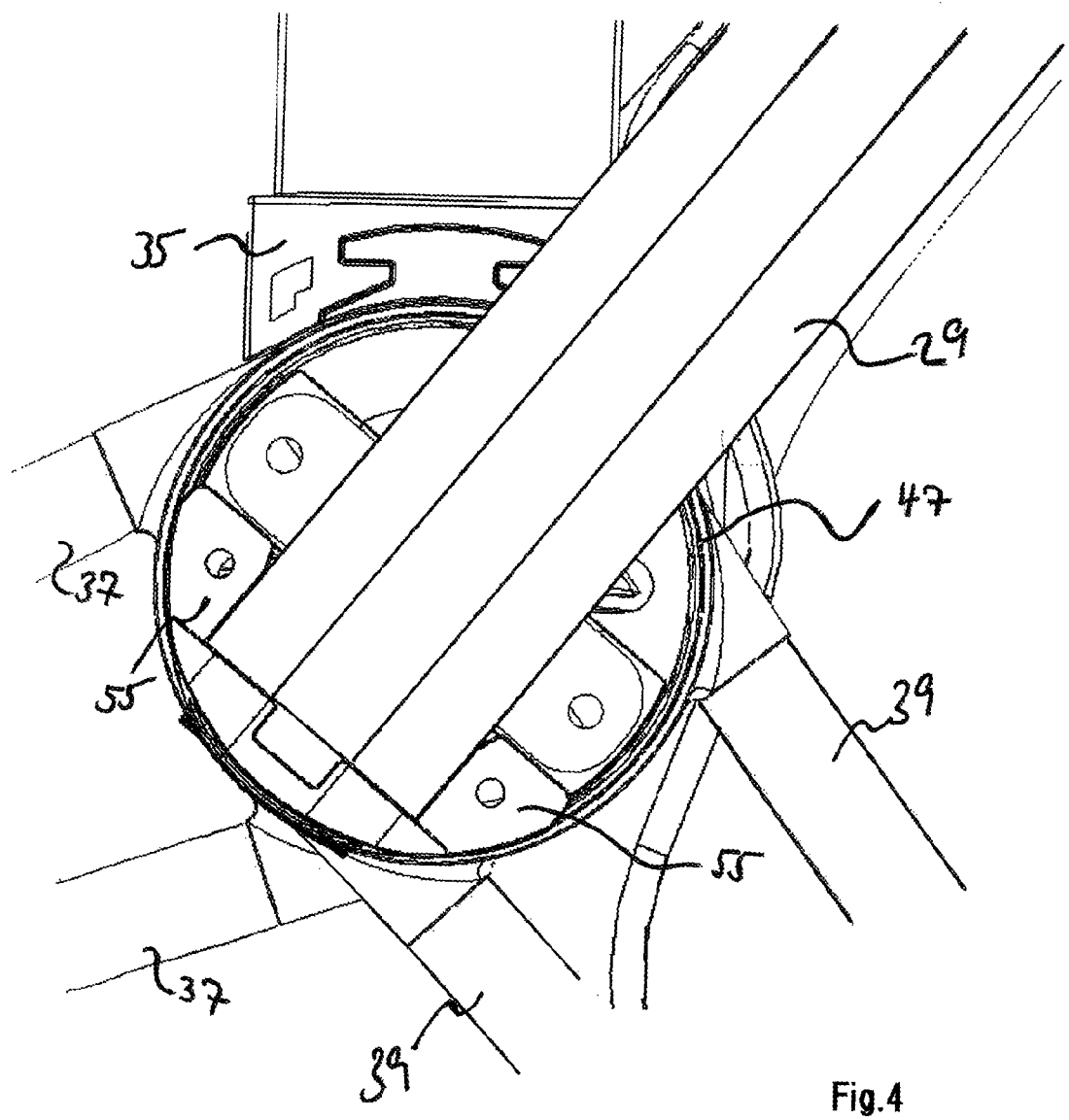
FIG. 4 shows an end face view of a partly opened switching unit of the child push chair frame.

FIG. 4 shows an end face view of the actuating portion 47, wherein the cover 53 of the housing of the actuating portion 47 shown in FIG. 3 has been removed. The figure makes clear that the pusher receptacle 29 extends into the actuating portion 47 and is held there with the aid of guide elements 55. The guide elements 55 are preferably connected integrally with the pusher receptacle 29 and are held locally fixed in the actuating portion 47 by blocking elements 56.

Figure 5:
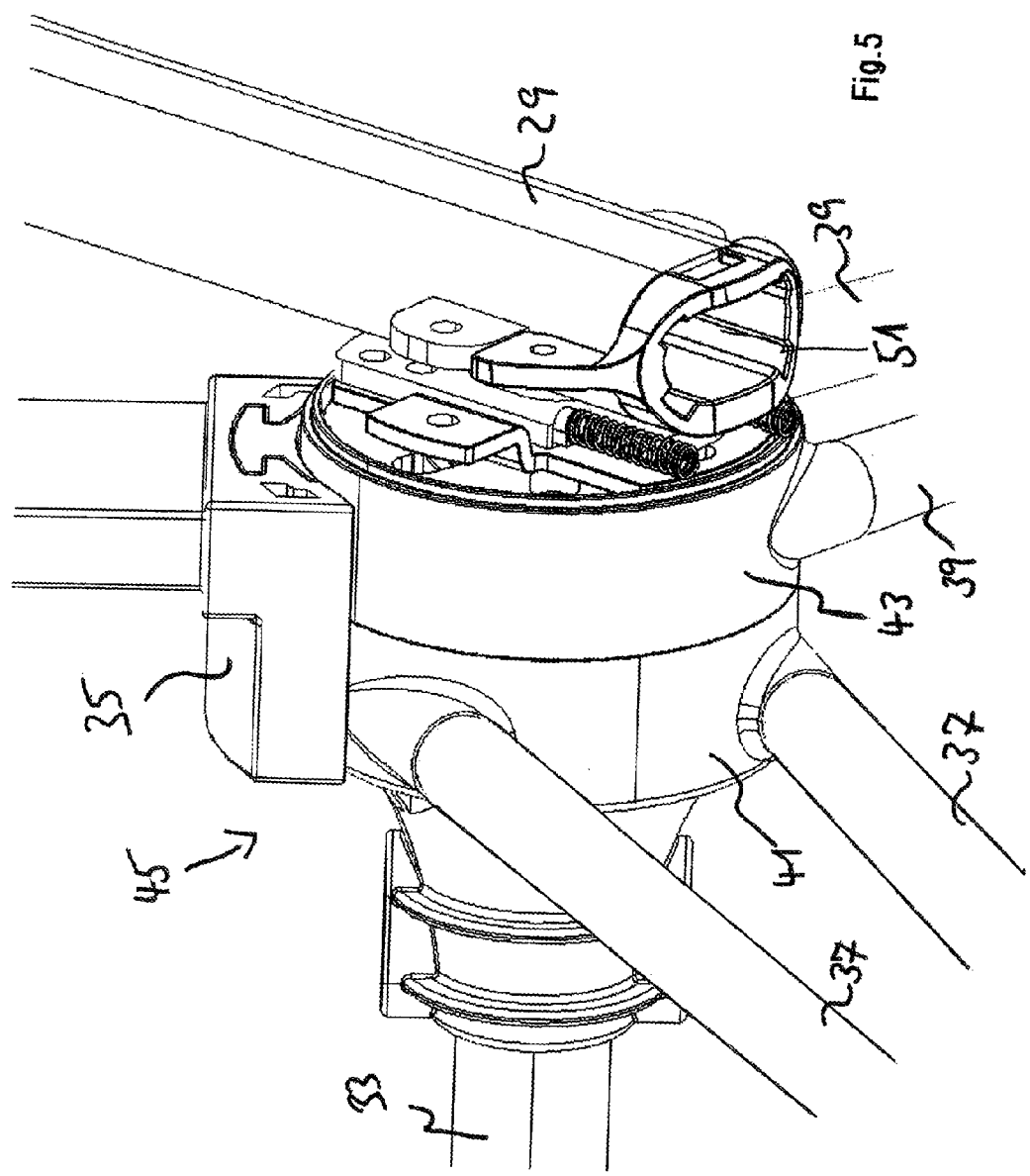
FIG. 5 shows a perspective view of a partly opened switching unit of the child push chair frame.

FIG. 5 shows a corresponding perspective representation without the housing of the actuating portion 47. On the side facing toward the rear bearing portion 43, the pusher receptacle 29 is at least partially open so that the (actuating) bolt 57 visible in FIG. 6 can project into the interior of the pusher receptacle 29. It is also clear that the through opening 51 is configured in the pusher receptacle 29.

Figure 6:
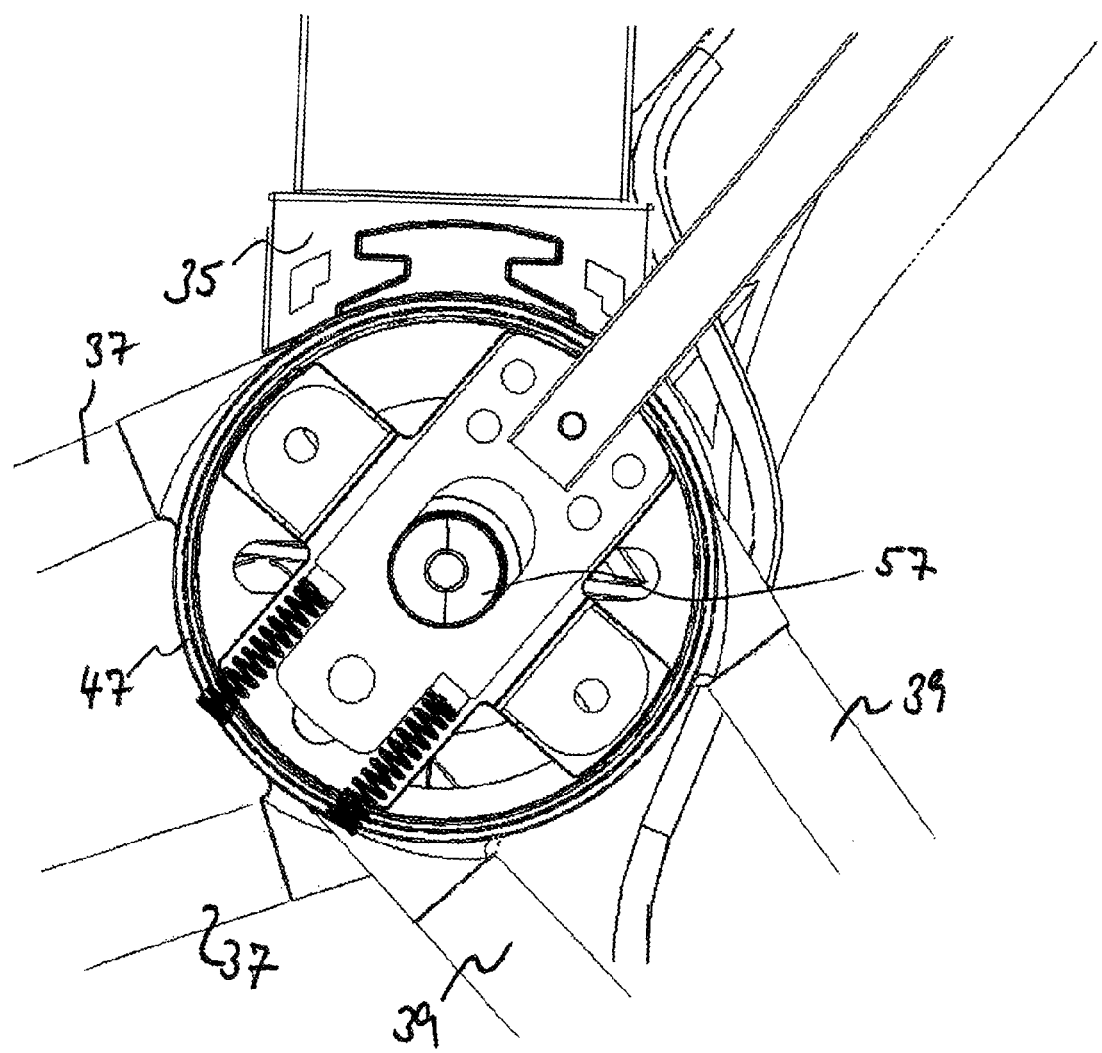
FIG. 6 shows an end face view of a partly opened switching unit of the child push chair frame.
Figure 7:
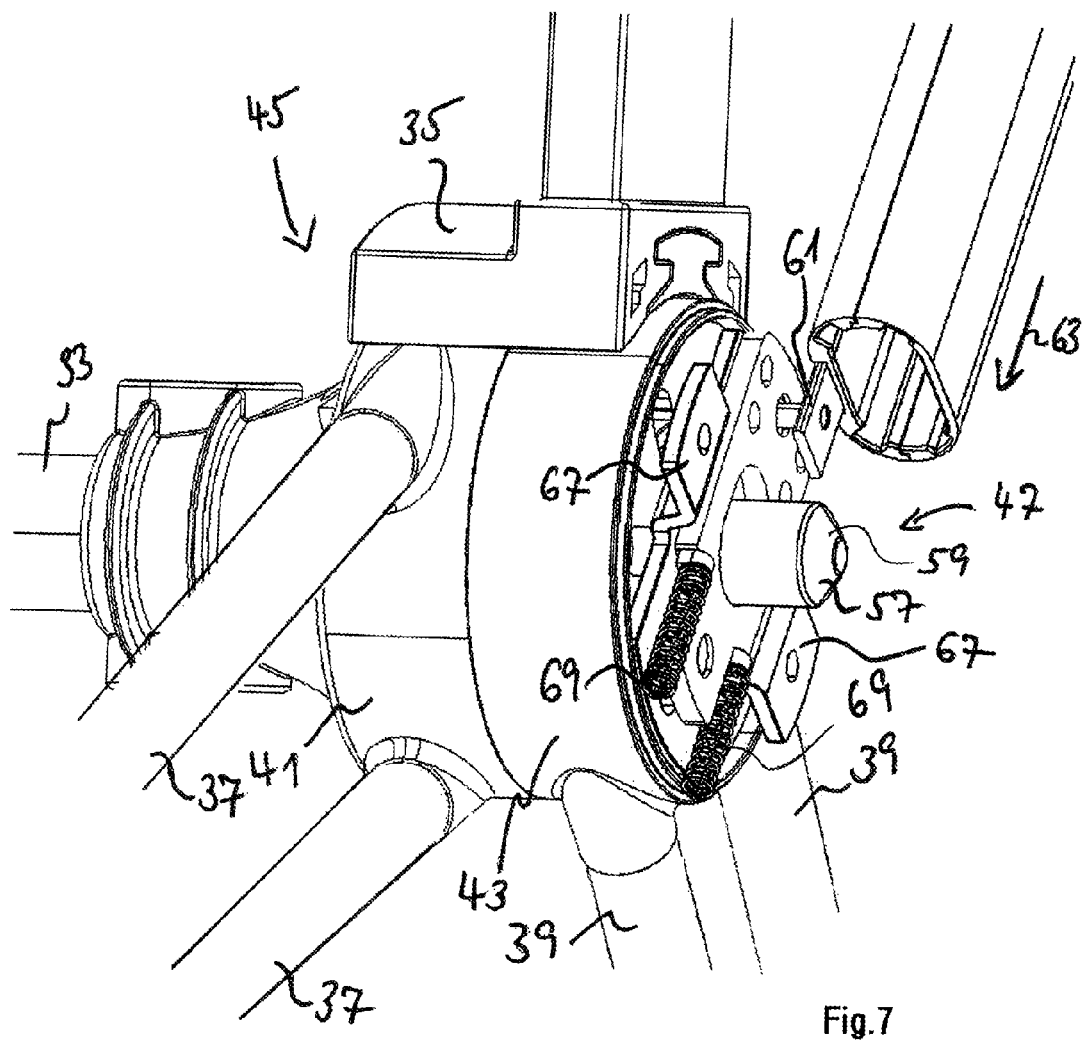
FIG. 7 shows a perspective view of a partly opened switching unit of the child push chair frame.

FIGS. 6 and 7 show an end face view and a perspective representation of the switching unit 45, wherein for better clarity, the pusher receptacle 29 is not shown in the actuating portion 47. The bolt 57 is essentially arranged centrally in the actuating portion 47 along the central axle 33 and is spring mounted therein. The distal end 59 of the bolt 57 is configured conically and extends, by means of a corresponding cut-out, into the pusher receptacle 29 (not shown in FIGS. 6 and 7).

Due to the conical configuration of the distal end 59 of the bolt 57, on displacement of the limb 23 of the pusher 17 sufficiently far into the pusher receptacle 29, a displacement of the bolt 57 against the spring force can be brought about. Furthermore, the pusher 17 and, in particular, the limb 23 thereof cooperates with an elongate actuating element 61 which, on extension of the pusher 17 in the direction of the arrow 63, also cooperates with a displacement plate 65, the displacement of which is determined by guide elements 67. The guide elements 67 are firmly installed in the actuating portion 47. On displacement of the actuating element 61 in the direction of the arrow 63, a displacement of the displacement plate 65 also takes place in the direction of the arrow 63, wherein the displacement is carried out against a spring force of two spring elements 69.

The bolt 57 extends through an elongate or oval through bore in the displacement plate 65 so that the bolt 57 extending through the displacement plate 65 does not block a movement of the displacement plate 65 in the direction of the arrow 63. A displacement of the actuating element 61 in the direction of the arrow 63 takes place first on displacement of the pusher 17 sufficiently far in the pusher receptacle 29 with a clamping means 31 opened.

Figure 8:
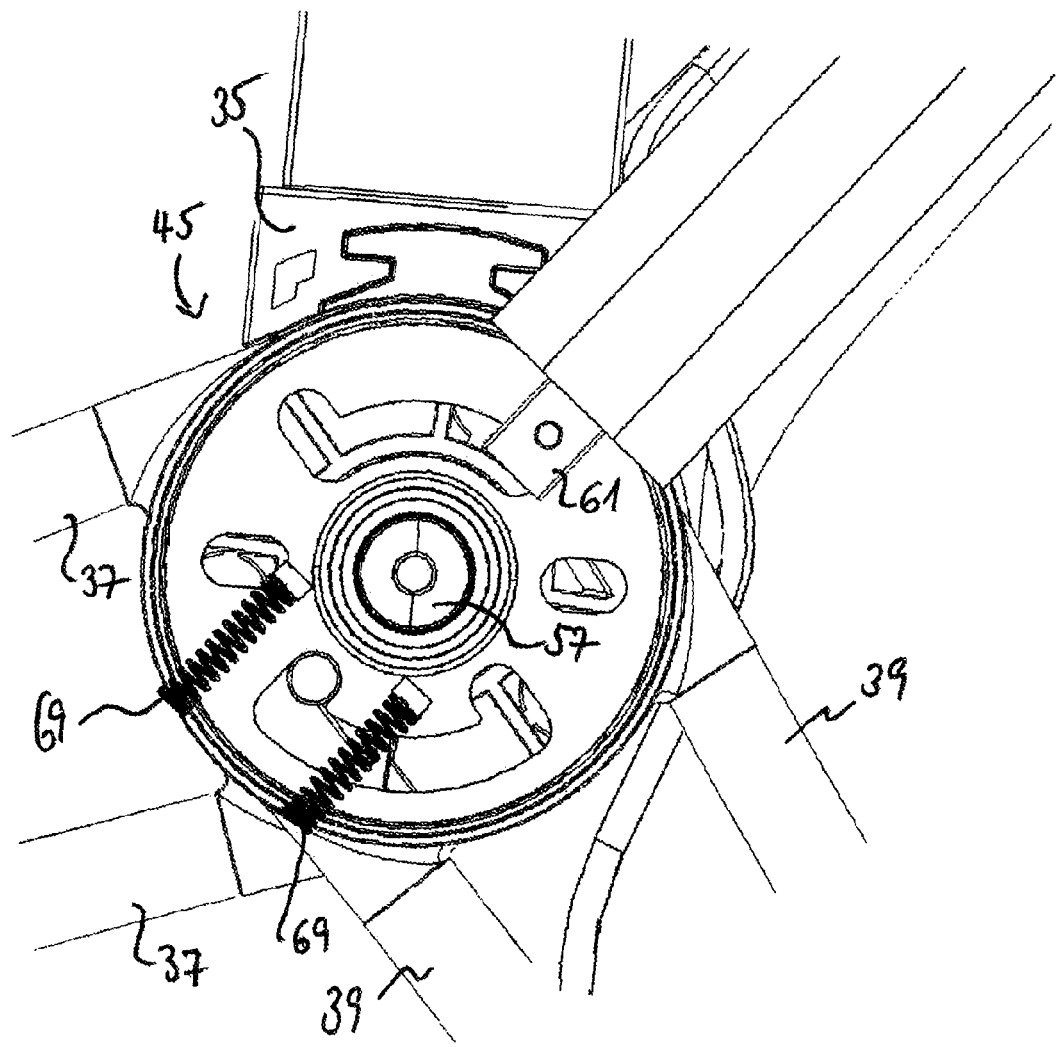
FIG. 8 shows an end face view of a partly opened switching unit of the child push chair frame.
Figure 9:
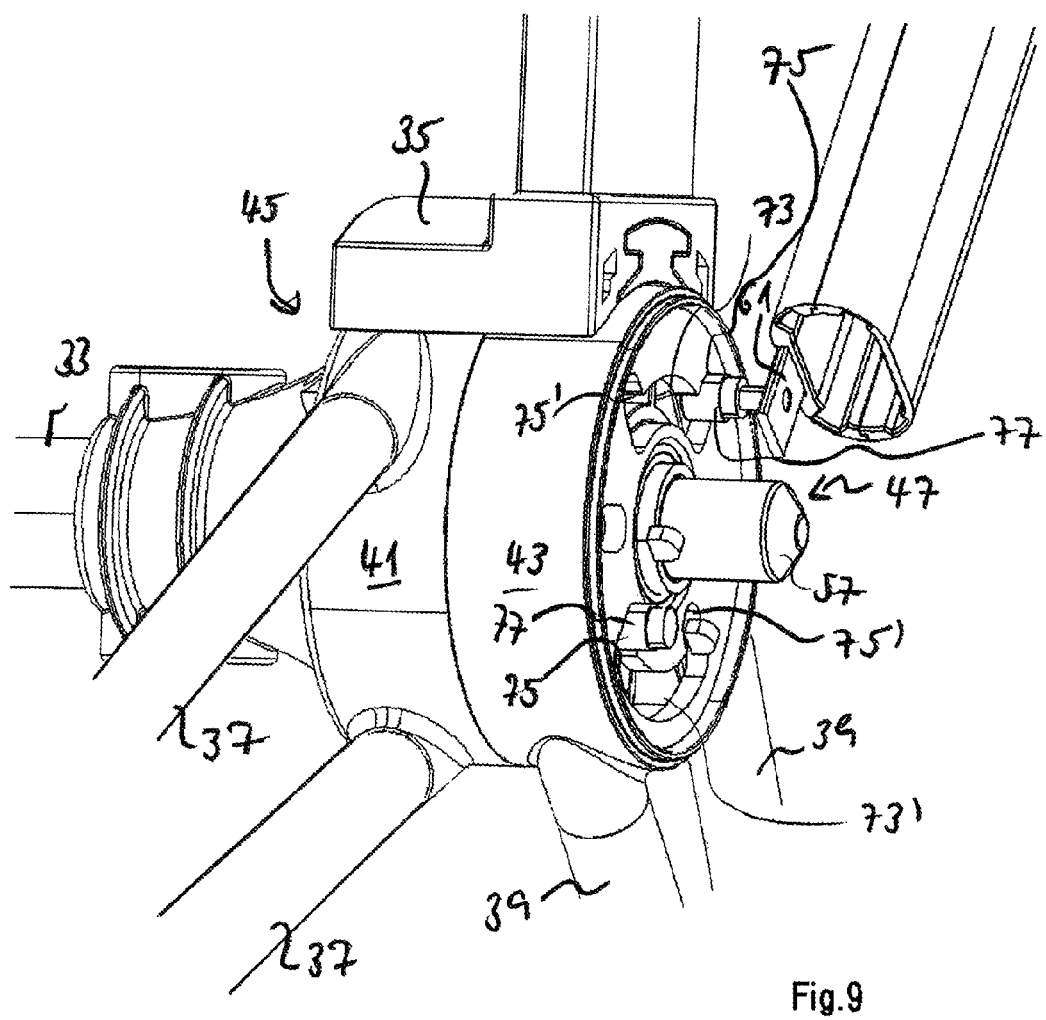
FIG. 9 shows a perspective view of a partly opened switching unit of the child push chair frame.

FIG. 8 shows another end face view of the switching unit 45, wherein for reasons of clarity, the pusher receptacle 29 and the displacement plate 65 and further elements of the actuating portion 47 are not shown. FIGS. 8 and 9 make clear that a circular disk element 71 is in contact with the rear bearing portion 43 and has two point-symmetrically arranged, circular sector-shaped grooves 73, 73' at each end of which, in each case, a locking cut-out 75, 75' is arranged. Furthermore, the circular disk element 71 is penetrated by the bolt 57.

The actuating element 61 is connected to the bolt 77 which penetrates the circular disk element 71 and latches in a locking cut-out 75 through the force of the spring elements 69 which act on the displacement plate 65 (not shown in FIGS. 8 and 9). On displacement of the actuating element 61 and a resulting displacement of the displacement plate 65 against the force of the spring elements 69, the bolt 77 is introduced into the groove 73 or 73'. In this operating state, the pusher 17 can rotate along the groove 73 or 73' about the bolt 57 until the opposite end of the groove 73, 73' is reached. The bolt 77 then latches into the opposite locking cut-out 75. In this operating state, the pusher 17 is latched such that the bolt 57 remains in its pushed-in position until the pusher 17 is rotated back into its original position.

The displacement of the bolt 47 along the central axle 33 causes, by means of a suitable mechanical apparatus, the release of a non-rotatable connection between the front bearing portion 41 and the rear bearing portion 43.

Figure 10:
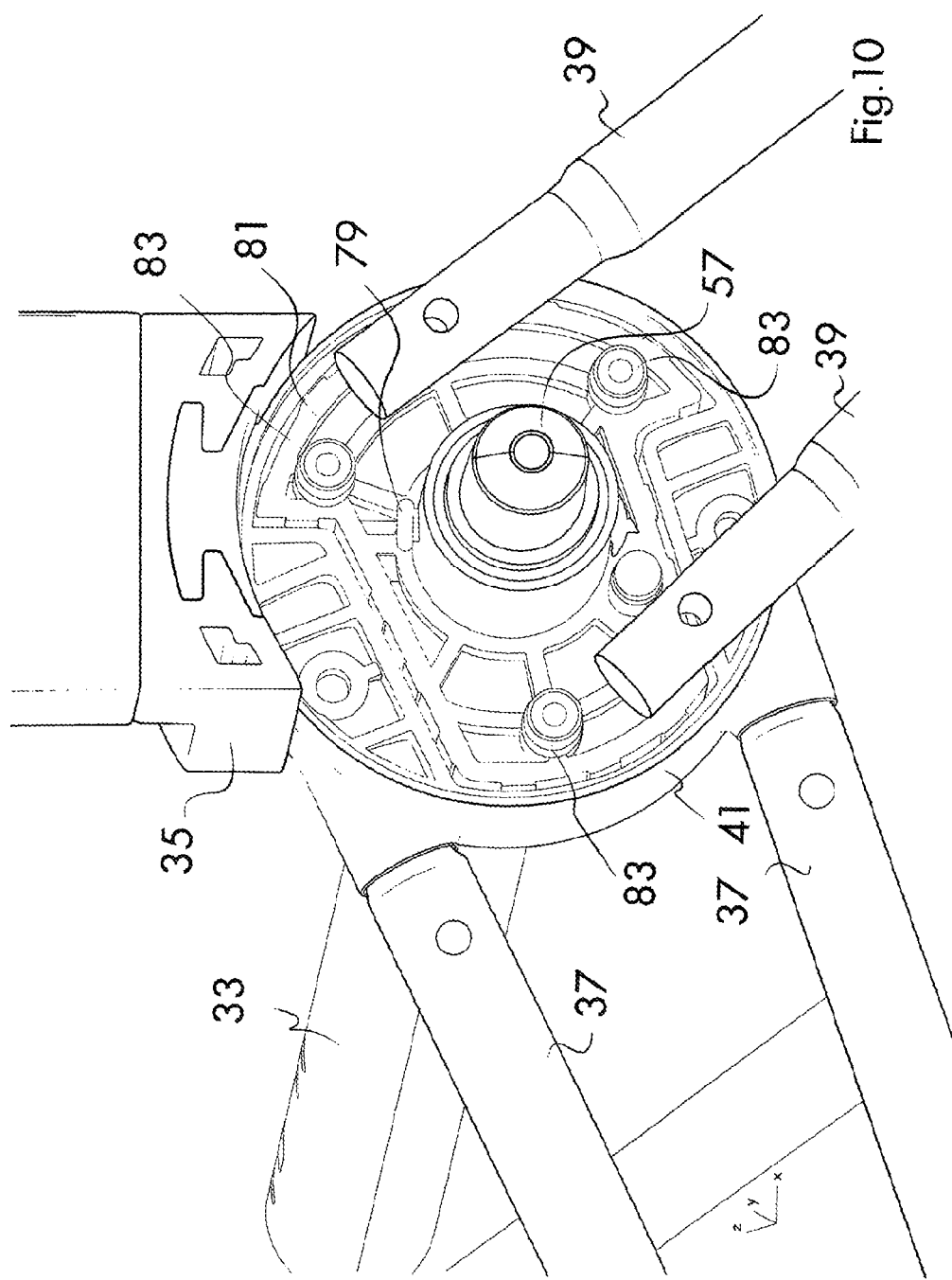
FIG. 10 shows a perspective view of a partly opened switching unit of the child push chair frame.

An exemplary representation of a mechanism of this type is shown in FIG. 10. The drawing makes clear that on displacement of the bolt 57 against a spring (not shown in FIG. 10), a driver element 79 is displaced in the direction of the central axle 33, and said driver element acts against a blocking insert 81. The blocking insert 81 is configured anchor-shaped so that it can engage in form-fitting manner in a complementary-shaped opening of the front bearing portion 41 and is displaceably mounted on the central axle 33.

The blocking insert 81 comprises a plurality of bolts 83 which can engage in corresponding recesses of the rear bearing portion 43 to block a rotary connection between the rear and the front bearing portion when the bolt 57 is not displaced by the pusher 17 against the spring force in the central axle 33. A displacement of the blocking insert 81 is brought about by the driver element 79 when the pusher 17 is introduced into the actuating portion 47 and the spring-mounted bolt 57 is thereby displaced along the central axle 33.

Preferably, the blocking insert 81 is thereby also displaced against a spring force so that on release of the bolt 57, the blocking insert 81 is displaced again in the direction of the rear bearing portion 43 in order thus to re-establish the non-rotatable connection between the two bearing portions (first operating state of the switching unit 45). As soon as the blockage between the bearing portions 41 and 43 is released (second operating state of the switching unit 45), both the bearing portions 41, 43 are mounted on the central axle 33 rotatable relative to one another, so that the angle between the rear and the front stabilizing struts 37, 39 is changeable. In this operating state, the connecting piece 11, 11' can be folded between the front wheels and the rear wheels by means of the joint 13 such that the separation a between the front wheels 7, 7' and the rear wheels 3, 3' is reduced in order to create either a transportation state of the child push chair frame 1 or an operating state of the child push chair frame 1.

FIG. 10 clearly shows that the blocking insert 81 can be introduced in form-fitting manner into a correspondingly configured cut-out in the front bearing portion 41. In the present exemplary embodiment, the switching unit 45 is configured essentially substantially cylindrical like its component elements (front bearing portion 41, rear bearing portion 43 and actuating portion 47). Fundamentally, however, another form is also conceivable.

Figure 11:
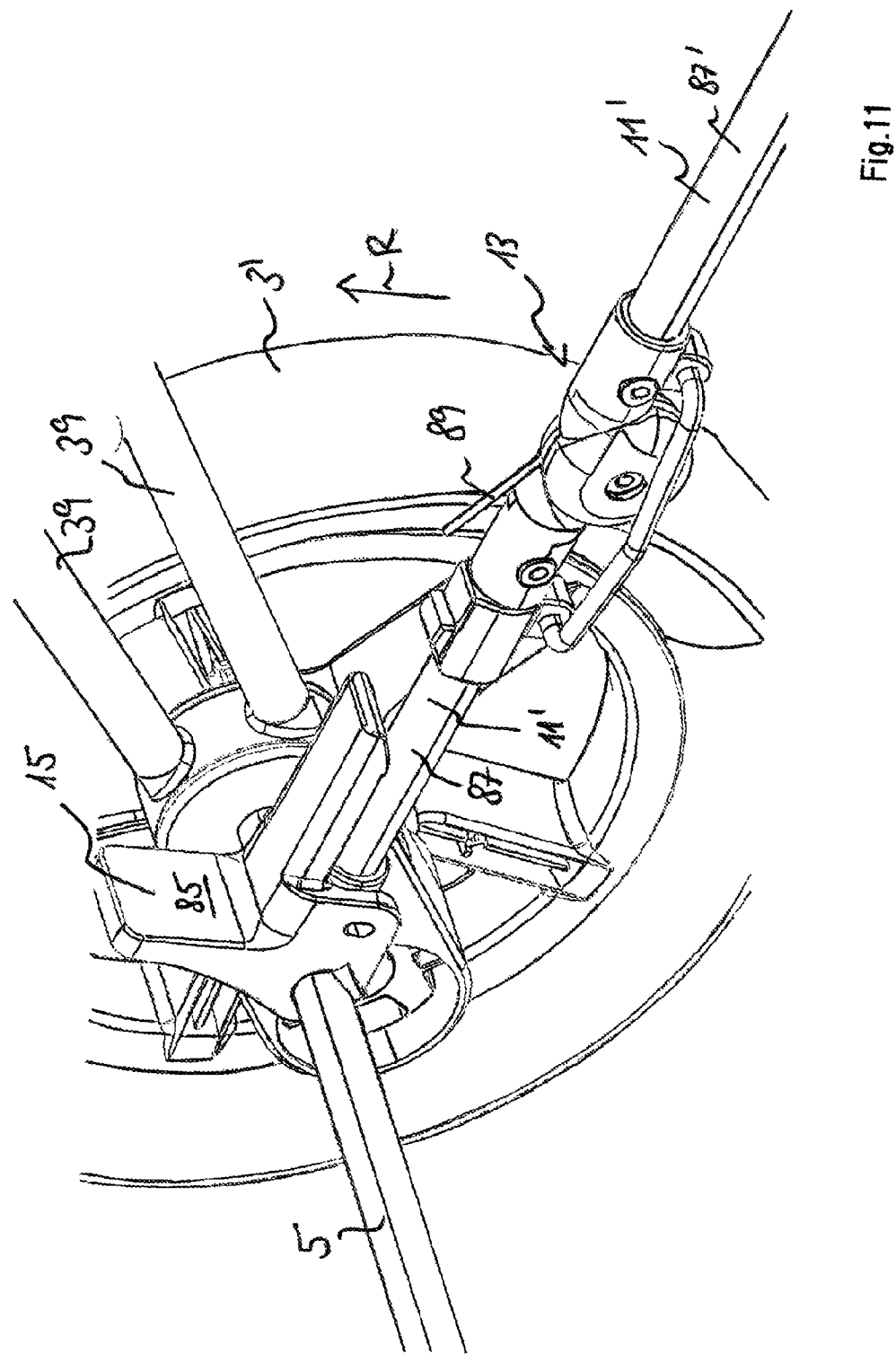
FIG. 11 shows a perspective view of a foot actuating mechanism of the child push chair frame.

FIG. 11 shows a detailed representation of the foot actuating mechanism 15. The foot actuating mechanism 15 is fastened to the rear axle 5 and is, in particular, mounted rotatably thereon. The foot actuating mechanism 15 herein also has an opening into which one end of the connecting piece 11' projects. If a shoe is placed on the stepping surface 85 of the foot actuating mechanism 15, the foot actuating mechanism 15 rotates about the rear axle 5, so that two partial portions 87 and 87' of the connecting piece 11' are no longer arranged at an angle of 180° to one another. In this way, the joint 13 is displaced in the direction of the arrow R against the force of a spring element 89 which is arranged spirally in the joint 13 and ensures that the child push chair frame 1 can unfold from a folded-together state shown in FIG. 2c or 2d semi-automatically through the force of the spring element 89 back into the operational state. As indicated in the introductory part, in place of the foot actuating element 15, an apparatus actuated by hand for actuating the joint 13 can be provided. A corresponding mechanism could be carried out, for example, by actuating the bolt 57 by means of the pusher 17.

Overall, embodiments provide an advantageous child push chair frame 1 which can be converted into various advantageous operational states. The respective state of the child push chair frame can be fixed by means of suitable locking positions of the two bearing portions 41, 43 relative to one another. For this purpose, for example, the bearing portions 41, 43 can have corresponding arresting means in suitable angular positions to one another.

By means of the central switching units 45, one of which is arranged at either end of a central axle 33, by a simple actuation through displacement of the pusher 17, the non-rotatable connection between the bearing portions 41, 43 of the switching units 45 can be released, in order thus to instigate a folding procedure of the child push chair frame 1.

Preferably, the two bearing portions 41 and 43 are rotatable relative to one another such that they are arrestable in at least two different angular positions and thus in different positions. In this way, not only can a standing-capable operating state of the child push chair frame 1 be achieved, but it is also possible, by means of a further arresting position, to achieve complete folding-together and therefore a conversion of the child push chair frame 1 to a minimal size. In the respective positions, the pusher 17 can either be pushed in or pulled out, so that essentially, use of the child push chair is possible in both the operational states, provided a child push chair upper part 49 is connected to the child push chair frame 1.

Figure 12:
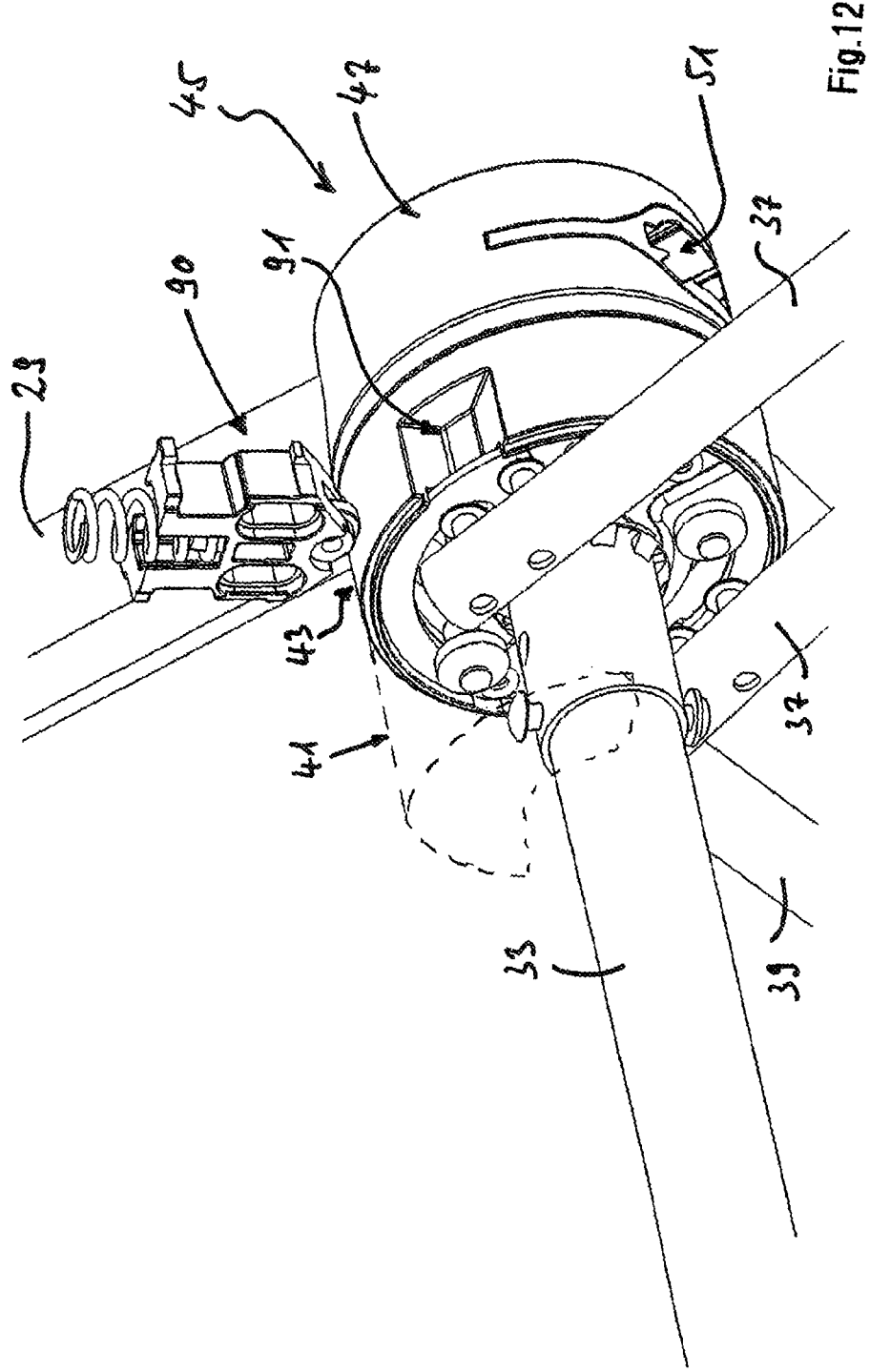
FIG. 12 shows a schematic representation of the switching unit.

FIG. 12 shows an embodiment wherein the fastening means 35 firmly connected to the front bearing portion 41 for fastening a child push chair upper part 49 comprise an elastically pre-tensioned locking bolt 90 which corresponds with a locking recess 91 arranged on the outer periphery of the rear bearing portion 43 and, together with this locking recess 91, forms a "soft lock". This locking mechanism defines the "parking position" of the child push chair frame in which the front 37 and rear 39 stabilizing struts are not fully folded together.

Figure 13:
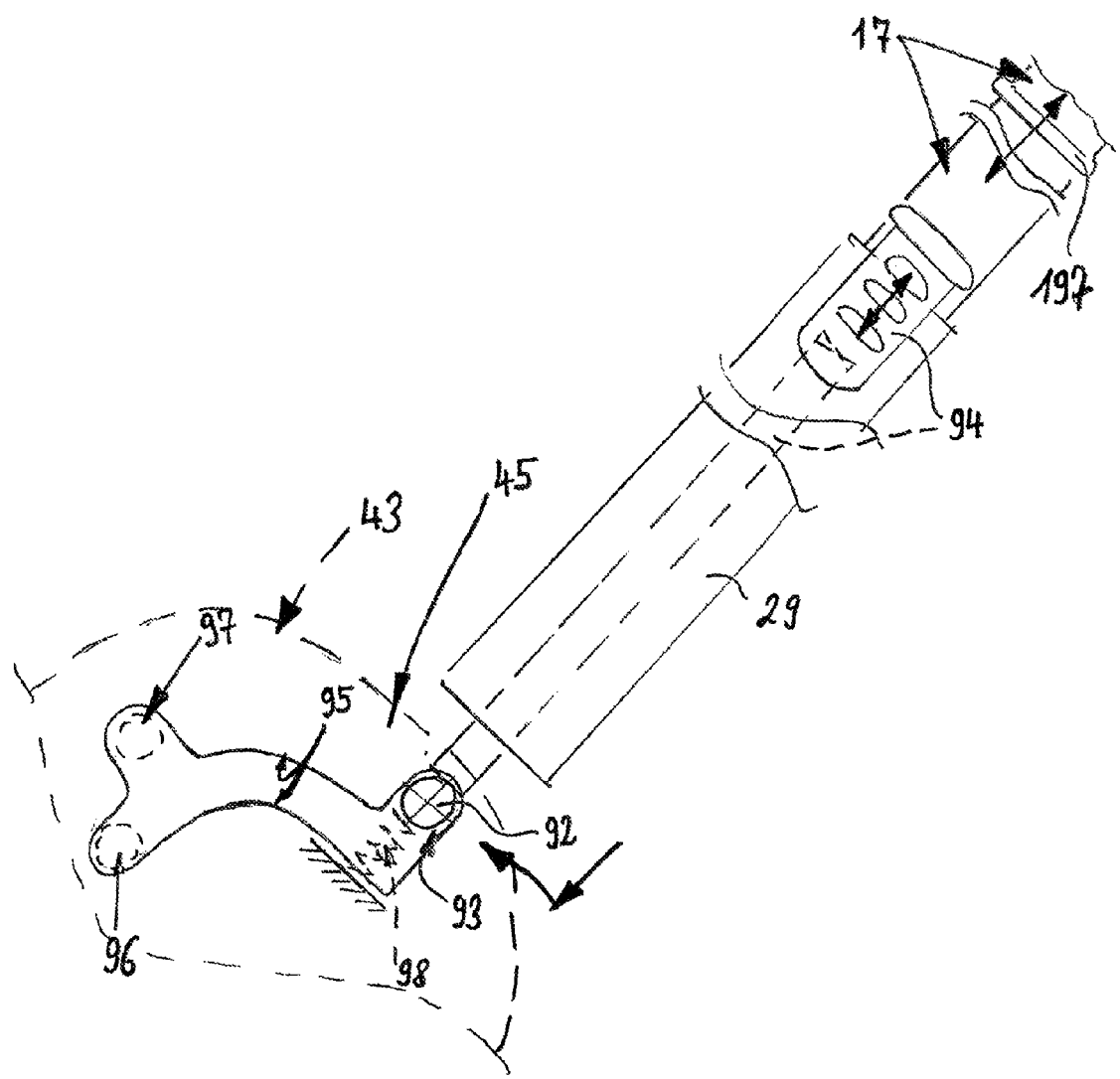
FIG. 13 shows a schematic representation of the function/actuation of the switching unit.

According to FIG. 13, the switching unit 45 comprises a locking pin 92 which, in the spread-apart travelling position of the stabilizing struts, is situated within a locking recess 93. By means of an actuating pusher 94 which is mounted longitudinally displaceable within the pusher receptacle 29, the locking pin 92 can be moved out of the locking recess 93, specifically in a circular arc-shaped guide section 95 and, together with the pusher 17, into an end position 96 in which the front 37 and rear 39 stabilizing struts are fully folded together. Together with the pusher 17, the rear stabilizing struts 39 are foldable in the direction of the front stabilizing struts 37. The circular arc-shaped guide section 95 is arranged within the rear bearing portion 43 which is connected to the rear stabilizing struts 39.

With the pusher 17 fully driven in, the aforementioned actuating pushers 94 can be moved by switching projections 197 mounted thereon into the aforementioned unlocking position. In this way, the switching unit 45 can be unlatched by the pusher 17.

The circular arc-shaped guide section 95 can have another locking recess 97 shortly before the end stop 96 in which the locking bolt 92 can be introduced if needed, specifically by means of a spring force (spring 98) acting on the locking bolt 92. In this way, the parking position of the child push chair frame can be fixed. The unlatching is then carried out in the same way as the unlatching in the spread-apart travelling position of the child push chair frame.

According to another alternative embodiment shown in FIGS. 14a to 14e, this comprises a switching unit 45 wherein a displacement plate 65 which has at one end one, preferably two, locking projections 99 or at the opposite end, a further locking projection 100. These locking projections 99, 100 correspond with associated locking recesses 101, 102 on a switching disk 103 of the switching unit 45. By means of the pusher 17, the aforementioned projections 99, 100 are brought into an unlatching position (FIG. 14b, arrow 108 in FIG. 14a). Thereafter, the switching disk 103 can be rotated relative to the displacement plate 65 (arrow 104 in FIG. 14c) until the one locking projection 100 engages in a recess 106 of a spring-loaded hook 105. In this position, the front and rear stabilizing struts 37, 39 are fully folded together and locked in the transportation position (FIG. 14d). For unlocking, the displacement plate 65 is moved by means of the pusher 17 into an unlatching position. The small latching projection 100 then moves out of the associated recess 106 on the locking hook 105 (arrow 107 in FIG. 14d), so that the switching disk 103 can be turned back into the original position, specifically into a position in which the front and rear stabilizing struts 37, 39 are again fully spread apart (FIG. 14a). The displacement plate (65) is movable against an elastic pre-tension out of the locking position.

Another embodiment, shown in FIGS. 15a and 15b, further differentiates between a locking projection 109 connected to the displacement plate (65) and a pin-like projection 111 guided within a circular arc-shaped guide section 110. This pin-like projection 111 is configured to serve as a rotation stop and to bear transverse loads. In the end positions of the stop pin 111, the locking projection 109 is transverse load-free. The locking projection 109 therefore serves only to define the latching position in the fully spread-apart position of the stabilizing struts 37, 39 and does not bear any transverse loads.

LIST OF REFERENCE NUMBERS

1 Child push chair frame
3, 3' Rear wheels
5 Rear axle
7, 7' Front wheels
9 Front axle
11, 11' Connecting piece
13 Joint
15 Foot actuating mechanism
17 Pusher
19 Handle region
21 Height adjustment device
23 Limb
25 Arrow
27 Distal end
29 Pusher receptacle
31 Clamping means
33 Central axle
35, 35' Fastening means
37 Front stabilizing struts
39 Rear stabilizing struts
41 Front bearing portion
43 Rear bearing portion
45 Switching unit
47 Actuating portion
49 Child push chair upper part
51 Through opening
53 Cover
55 Guide elements
56 Blocking elements
57 Bolt
59 Distal end
61 Actuating element
63 Arrow
65 Displacement plate
67 Guide elements
69 Spring elements
71 Circular disk element
73, 73' Grooves
75, 75' Locking cut-outs
77 Bolt
79 Driver element
81 Blocking insert
83 Bolt
85 Stepping surface
87, 87' Partial portions
89 Spring element
90 Locking bolt
91 Locking recess (for locking bolt)
92 Locking pin
93 Locking recess (for locking pin)
94 Actuating pusher
95 Guide section
96 End position/end stop
97 Locking recess (before end stop)
98 Spring
99 Locking projection
100 Further locking projection
101 Locking recess
102 Locking recess
103 Switching disk
104 Arrow
105 Hook
106 Recess
107 Arrow
108 Arrow
109 Locking projection
110 Guide section
111 Projection
197 Switching projections
M Central plane
D Rotary axis
R Direction
a Separation

The invention claimed is:

1. A child push chair frame having two rear wheels and at least one front wheel and a pusher to push the child push chair frame and a fastening means for fastening a child push chair upper part, wherein
the rear wheels and the at least one front wheel or rotary axles thereof are each connected to one another by means of one or more rear and front stabilizing struts in an articulated manner about a central axle which extends approximately parallel to a common rotary axle of the rear wheels such that said stabilizing struts are foldable from a spread-apart travelling position into a fully folded-together transportation position and vice versa, and are latchable between these two positions in at least one further position, the at least one further position comprising a parking position in which the child push chair frame is capable of standing up and is smaller in size compared to the travelling position.

2. The child push chair frame according to claim 1, wherein
the stabilizing struts are also latchable in the fully folded-together transportation position.

3. The child push chair frame according to claim 1, wherein
the spread-apart travelling position of the stabilizing struts can be fixed by means of the articulated connection between the rear and the front stabilizing struts.

4. The child push chair frame according to claim 1, wherein
the stabilizing struts can also be fixed in the fully folded-together transportation position or in the at least one further position by means of the articulated connection between rear and front stabilizing struts and, if necessary, unlatched.

5. The child push chair frame according to claim 3, wherein
the articulated connection between rear and front stabilizing struts comprises a switching unit by means of which the articulated connection is switchable from a fixing position into a releasing position and vice versa.

6. The child push chair frame according to claim 1, wherein each of the two rear wheels is additionally connected to the at least one front wheel by means of a connecting piece, wherein
the connecting pieces are configured to be foldable such that they enable unforced folding together or folding apart of the rear and front stabilizing struts about the articulated connection thereof or through the central axle defined by the articulated connection.

7. The child push chair frame according to claim 6, wherein
the connecting pieces each have a joint at approximately half the distance between the rear wheel and the front wheel.

8. The child push chair frame according to claim 6, wherein
a foot actuating mechanism for initiating the folding process of the stabilizing struts and possibly also of the connecting pieces is provided at a proximal end of a connecting piece.

9. The child push chair frame according to claim 6, wherein
the connecting pieces form at least part of a basket receiving frame.

10. The child push chair frame according to claim 1, wherein
the fastening means for fastening the child push chair upper part are arranged in the region of the central axle.

11. The child push chair frame according to one of the claim 5, wherein
the switching unit comprises an actuating portion and a front and a rear bearing portion, wherein the actuating portion serves to accommodate a limb of the pusher, the rear bearing portion serves to accommodate the proximal end of the rear stabilizing strut(s) and the front bearing portion serves to accommodate the proximal end of the front stabilizing strut(s).

12. The child push chair frame according to claim 11, wherein
the front and the rear bearing portion are arranged along the central axle directly adjoining one another.

13. The child push chair frame according to claim 11, wherein
the rear and the front bearing portion can be connected non-rotatably to one another in a normal operational state of the child push chair frame.

14. The child push chair frame according to claim 11, wherein
in order to initiate a folding process of the connecting pieces, the rear and the front bearing portion are rotatably connectable to one another.

15. The child push chair frame according to claim 11, wherein
switching over between a rotatable and a non-rotatable connection between the rear and the front bearing portion of a switching unit is advantageously achieved by means of a displacement of the pusher in the actuating portion of the respective switching unit.

16. The child push chair frame according to claim 11, wherein
a displacement of the pusher in the actuating portion causes a displacement of an unlatching bolt along the central axle.

17. The child push chair frame according to claim 5, wherein
the switching unit is actuatable by means of a displacement of the pusher.

18. The child push chair frame according to claim 11, wherein
the front bearing portion and the actuating portion are each non-rotatably connected to the central axle and in that the fastening means firmly connected to the front bearing portion for fastening the child push chair upper part comprise an elastically pre-tensioned locking bolt which corresponds with a locking recess arranged on the outer periphery of the rear bearing portion and, together with said locking recess, forms a "soft lock".

19. The child push chair frame according to claim 5, wherein
the switching unit comprises a locking pin which is arranged, in the spread-apart travelling position of the stabilizing struts, within a locking recess, wherein the locking pin which is mounted longitudinally displaceable on a pusher receptacle, can be moved by means of an actuating pusher out of the locking recess and, together with the pusher, into an end position in which the front and rear stabilizing struts are fully folded together.

20. The child push chair frame according to claim 11, wherein
the actuating portion is mounted rotatable relative to the front and the rear bearing portion of the switching unit.

21. A child push chair comprising the child push chair frame according to claim 1 and the child push chair upper part.

22. The child push chair frame of claim 1, wherein the child push chair frame is implemented as a child push chair sports frame or a buggy frame.

23. The child push chair frame of claim 1, wherein the at least one further position is a parking position.

24. The child push chair frame of claim 4, wherein the at least one further position is a parking position.

25. The child push chair frame of claim 5, wherein the articulated connection is switchable from a locked state into an unlocked state and vice versa.

26. The child push chair of claim 17, wherein the displacement is either a sliding or a rotary movement.

27. The child push chair of claim 17, wherein the displacement is a combination of a sliding movement and a rotary movement.

28. The child push chair of claim 19, wherein the actuating pusher is an essentially circular arc-shaped guide section.

* * * * *